Patented Aug. 18, 1942

2,293,546

UNITED STATES PATENT OFFICE 2,293,546

LEAK-SEALING COMPOSITION

Reynold E. Holmen, Rockford, Ill., assignor to E. I. du Pont de Nemours & Company, Wilmington, Del., a corporation of Delaware No Drawing. Application April 19, 1941,
Serial No. 389,361

7 Claims. (Cl. 106—33)

This invention relates to improvements in compositions of matter and the method of making them and, more particularly, to compositions useful in sealing leaks in water containers and circulating systems.

Heretofore, a great variety of substances and compositions have been used as stop-leaks. Such stop-leaks commonly comprise a mucilaginous or resinous binder and a finely divided solid to act as a filler and speed up the sealing of leaks by quickly reducing the size of the orifice to be sealed. Commonly used binders are glue, rosin, gum gambier, flour paste, starch paste, shellac, sodium silicate, and drying oils. Fillers commonly comprise asbestos, wood flour, paper pulp, aluminum powder, linseed meal, metallic oxides, graphite and sulfur. Some of the mentioned substances combine characteristics of both filler and binder; in this class are gum gambier and linseed meal. Gum gambier, by virtue of its content of water insoluble material, furnishes some solid or gummy filler as well as a binder; linseed meal contains sufficient mucilaginous matter to serve, to a degree, as its own binder. The flow of water carries the particles to the leak and evaporation of the water leaves the solid material deposited at that spot.

As it is the binder which seals and holds the plug in the leak, it will be apparent that the efficiency of the stop-leak depends largely on the properties of the binder. All binders in use heretofore present certain shortcomings. Some, such as glue, are permanently water sensitive, others such as gum gambier require a complicated cooking process to attain their maximum effectiveness, develop an offensive odor and color, and do not possess any outstanding adhesive properties. Gum gambier and shellac are imported materials and as such are subject to a variety of uncontrollable conditions which affect quality, supply and cost. Drying oils require far too long to set up under the conditions encountered to be generally useful.

A really desirable stop-leak should have a low cost, be capable of preparation from readily available materials, be readily dispersable in aqueous solutions, be non-injurious to the cooling system, have strong adhesive properties, and on exposure to air and heat should deposit from aqueous dispersion a tough, adhesive, water-resistant film as the solvent evaporates.

This invention has as an object therefore the preparation of a satisfactory and efficient stop-leak from domestic, low-cost raw materials. A further object is the preparation of a stop-leak, the characteristics of which may be readily controlled and altered. Another object is the preparation of a stop-leak which embodies the properties previously stated as highly desirable. Other objects will appear hereinafter.

These objects are accomplished in the present invention by using, alone or in conjunction with other useful materials already known to those versed in the art, a dispersion of resin formed by reacting a fractional ester of a polyhydric alcohol and fatty acids with at least twice the amount of rosin necessary to react with the remaining free hydroxyl groups of the fractional ester, said dispersion being effected in an aqueous solution of ammonia or water soluble amine.

The invention will be more readily understood from the following examples which are given by way of illustration.

A preferred form of this invention may be prepared according to the following example:

*Example I*

|  | Per cent |
|---|---|
| Soya bean oil | 1.0 |
| Glycerol | 0.2 |
| Rosin | 7.5 |
| Monoethanolamine | 1.2 |
| Water | 90.1 |
|  | 100.0 |

The soya bean oil and glycerol are heated together at about 235° C. to 245° C. for such a time as is required to insure substantially complete reaction to form a product which is substantially the mono-ester. To this product is then added the rosin and the temperature raised to 255° C. to 265° C., where it is held for such a time as is necessary to insure substantially complete reaction between the rosin and the free hydroxyl groups of the mono or diglycerides. The common practice of adding about 0.3% of lime as a catalyst for the above reactions aids in shortening the cooking time to about 20 minutes for the initial reaction, 15 to 30 minutes for the final one. The progress of the final reaction is readily followed by a determination of the acid number of the product which, in this example, should be between 120 and 130. The molten resin may then be dispersed with stirring in hot water (between 70° C. to 95° C.) containing the monoethanolamine.

The resulting concentrate may be added to a leaky cooling system in such quantity as to give a preferred final concentration of around 0.2 to 1% of the resinous material in the system, Through evaporation of the water and the presence of heat a firm, tight seal is gradually built up at the point where leakage occurred. Smaller or greater percentages of stop-leak may be used; smaller percentages merely lengthen the time necessary to seal the leak, while larger percentages provide faster action, but are usually unnecessary.

Example II

The composition of Example I to which is added 1% to 5% of wood flour.

Example III

The composition of Example II in which finely divided asbestos is substituted for wood flour.

Example IV

The composition of Example II in which aluminum powder is substituted for wood flour.

Example V

| | Per cent |
|---|---|
| Soya bean oil | 2.0 |
| Glycerol | 0.4 |
| Rosin | 7.5 |
| Monoethanolamine | 0.9 |
| Water | 89.2 |
| | 100.0 |

The instructions given for Example I apply also to Example V. The acid number of the resin should be between 85 to 90.

The present invention is not limited by the above examples as to proportions or particular ingredients. While it is usually more economical and convenient to use the fats or vegetable oils, the corresponding acids may be used. Other useful fats and vegetable oils having at least some drying properties include linseed, castor, tung, fish, corn, rapeseed and cottonseed oils, stearin and olein. The use of other oils or fats with similar properties will be apparent to those skilled in the art. Obviously, the use of non-drying oils will result in a product which changes little on aging and exposure to the air, while the use of drying oils will result in a product which tends to become tougher and more water resistant with prolonged exposure.

Ethylene glycol, diethylene glycol, pentaerythritol, mannitol and sorbitol are common examples of polyhydric alcohols which may be substituted for glycerol, although usually no particular advantage will be obtained by doing so.

Hydrogenated rosin may be substituted for rosin. The mixture of resin and fatty acids known as tallol may be substituted for part of the rosin and for the fatty acids previously mentioned. The product obtained from rosin and maleic anhydride through the well known Diels-Alder reaction may be used instead of all or part of the rosin.

In general, it is preferred to use water-soluble amines having a boiling point lower than 200° C. in order to insure adequate volatility and promote the water resistance of the plug formed by the stop-leak. Examples of amines in this class are monoethanolamine, ethylenediamine, 2-ethylamino ethanol, 2-methylamino ethanol, morpholine, N-ethyl morpholine, triethylamine, 2-dimethylamino ethanol. While ammonia may be used to obtain seals of the greatest water resistance in a short time, it is usually more convenient to use an amine of lower volatility. If maximum water resistance is not necessary, a higher boiling amine such as triethanolamine, B. P. 278° C., may be employed. The acid number of the resin will, of course, determine the quantity of amine used.

The given reaction times and temperatures are by way of illustration only, and variations to suit individual needs will be obvious to those versed in the art.

While useful compositions will result from a wide variation in proportions of ingredients used in making the resin, the most outstanding properties characteristic of this invention are exhibited by those formulated within the range of the following example:

Example VI

| | Parts |
|---|---|
| Fat or vegetable oil | 0.5–2.0 |
| Glycerol | 0.1–0.4 |
| Rosin | 7.5 |

In general, the amount of fractional ester of the polyhydric alcohol used should be such as to provide sufficient hydroxyl groups to react with from 10% to 45% of the rosin used, if complete reaction is assumed; of course, in actual practice complete reaction is neither conveniently attained nor essential.

Among the finely divided solids which may be added to hasten the sealing of large leaks are, in addition to those mentioned in previous examples, ground flaxseed meal, quince seeds, metallic oxides, paper pulp, bone black and graphite. The amounts of finely divided solids which may be used may be varied over a wide range, the maximum quantity being limited only by the ability of the resinous binder to cement the particles together.

Where the present invention is used in highly diluted form in very hard waters, the addition of small amounts of soluble phosphates, pyrophosphates or metaphosphates will help to prevent excessive precipitation of the resinous binder from solution.

With certain finely divided solids, such as asbestos, which contain some basic material which tends to react with and precipitate on to its surface some of the resin, improved dispersion of the finely divided solid may be obtained by the methods disclosed in the co-pending application of J. L. Evans and W. A. Hall, S. N. 389,420, filed April 19, 1941.

The physical manner in which the present invention seals leaks in water containers or circulatory cooling systems differs little, outwardly, from prior art. The flow of water through the leak carries the resinous binder and any suspended solids to the leak and there deposits them. The evaporation of water from the outer exposed side of the leak results in the deposition of the resinous soap binder at the site of the leak and the closure of the leak. The presence of heat causes decomposition of the amine soap and leaves a film of resin as a seal over the leak. However, the results secured according to the present invention are not so easily accounted for. It might be presumed that, since modification of rosin according to the present invention results in a water dispersible product of lower acid number than rosin alone, less amine is necessary for dispersion and hence there is less water-soluble material initially present in the dried film. Yet, this does not adequately explain the unexpected degree of improvement in the water resistance of dried films obtained from the present invention as compared with similar films of rosin soaps, as illustrated by an example in a later paragraph. Possibly, the soap of the present invention decomposes faster at a given temperature, though why this should be is not apparent.

An advantage of the present invention over existing art lies in the ease with which this stop-leak can be synthesized from readily obtainable domestic raw materials of low cost without any sacrifice in desirable properties. A further advantage lies in the readily controllable variation in properties which can be exerted through substitution of one oil or fat for another in the process of preparing the resinous product. Thus, by substituting stearin for soya bean oil in the composition of Example I there is obtained a product which changes but little on long exposure to air and heat, while by substituting linseed oil for soya bean oil there is obtained a product which tends to become increasingly tough and water resistant on aging. Another advantage of the present invention over a similar composition based on rosin alone is the greater toughness and flexibility of the films or seals obtained according to this invention.

Another unexpected advantage is the fact that films or seals obtained according to Example I set up to a tough, adherent water resistant character much faster than films or seals obtained from a similar product based on rosin alone, for instance, after four hours at 48° C., a film deposited by the composition of Example I becomes sufficiently resistant to shed water while a film deposited from an analogous composition prepared from rosin instead of the resin of Example I remains soapy and water-soluble even after twenty-one hours at 48° C. A further advantage is the facility with which the resin of this invention may be dispersed in hot aqueous solutions of an alkaline compound as compared with rosin, which tends to "ball up" and disperse only very slowly, perhaps due to its high melting point; neither is a complex cooking cycle necessary for dispersion, as is the case when gum gambier is used. Another advantage is the greater adhesiveness of seals obtained by the present invention, as compared with those of prior art mentioned in an earlier paragraph. A further advantage is the property of "self-healing" exhibited by the compositions of this invention: although a seal may be fractured by a sudden, sharp blow, it will on further standing tend to flow together and mend the break; this property is not exhibited by compositions of the prior art. Other advantages are freedom from obnoxious odor, objectionable color and ingredients that are corrosive to the cooling system. It is well recognized that water-dispersible resins may be made from glyceryl phthalate, glyceryl maleate, and related poly-esters, but these quickly hydrolyze in aqueous solution to free undesirable decomposition products. Such objections do not apply to the present invention or any of its hydrolysis products which might conceivably be formed.

It is apparent that many widely different embodiments of this invention may be made without departing from the spirit and scope thereof, and therefore, it is not intended to be limited except as indicated in the appended claims.

I claim:

1. A stop-leak composition comprising a dispersion of a resin formed by reacting a fractional ester of a polyhydric alcohol and a fatty acid with at least twice as much rosin as is necessary to react with the remaining free hydroxyl groups of the fractional ester, said dispersion being in an aqueous solution of a weak nitrogen containing base.

2. The composition of claim 1 in which the weak base is ammonia.

3. The composition of claim 1 in which the weak base is an amine.

4. The composition of claim 1 in which the acid number of the resin is about 100.

5. The composition of claim 1 in which the fatty acid is in the form of a vegetable oil having drying properties.

6. The composition of claim 1 in which the fatty acid is present in amount between .5 and 2.0% and a polyhydric alcohol is present in amount between .1 and .4%.

7. The process of preparing a stop-leak composition which comprises heating an oil having drying properties with a polyhydric alcohol to a temperature of about 235° C. until the product is substantially the mono-ester, thereafter adding rosin and heating to a temperature of about 255° C. until the free hydroxyl groups and the rosin have reacted to a substantial extent, and thereafter adding a small amount of an amine.

REYNOLD E. HOLMEN.